US012346591B2

(12) United States Patent
Nohta et al.

(10) Patent No.: US 12,346,591 B2
(45) Date of Patent: Jul. 1, 2025

(54) DATA MIGRATION BETWEEN VIRTUAL TAPE SYSTEMS USING TAPE VOLSER CONVERSION

(71) Applicant: International Business Machines Corporation, Armonk, NY (US)

(72) Inventors: Takeshi Nohta, Tsukuba (JP); Nao Takemura, Narashino (JP); Tomoaki Ogino, Chiba (JP); Taisei Takai, Tokyo (JP); Rin Fujiwara, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/234,836

(22) Filed: Aug. 16, 2023

(65) Prior Publication Data

US 2025/0060896 A1 Feb. 20, 2025

(51) Int. Cl.
*G06F 3/06* (2006.01)
(52) U.S. Cl.
CPC .......... *G06F 3/0647* (2013.01); *G06F 3/0604* (2013.01); *G06F 3/0665* (2013.01); *G06F 3/067* (2013.01)
(58) Field of Classification Search
CPC .... G06F 3/0647; G06F 3/0604; G06F 3/0665; G06F 3/067
See application file for complete search history.

(56) References Cited

U.S. PATENT DOCUMENTS

| | | | | |
|---|---|---|---|---|
| 2003/0074523 A1* | 4/2003 | Johnson | ................ | G06F 3/0685 711/112 |
| 2005/0108304 A1* | 5/2005 | Wilson | ................. | G06F 3/0617 |
| 2006/0106970 A1* | 5/2006 | Matsuda | ............... | G06F 3/0605 711/111 |
| 2007/0101097 A1* | 5/2007 | Serizawa | .............. | G06F 3/0617 711/203 |
| 2007/0239954 A1* | 10/2007 | Sakashita | ............... | G06F 3/067 711/170 |
| 2008/0256145 A1 | 10/2008 | Dalton et al. | | |
| 2012/0137098 A1* | 5/2012 | Wang | .................... | G06F 3/0647 711/E12.002 |

(Continued)

OTHER PUBLICATIONS

IBM, "Relocating a tape pool to a different library," IBM Spectrum Archive Enterprise Edition (EE), Mar. 5, 2021, 4 pages, retrieved from https://www.ibm.com/docs/en/spectrum-archive-ee/1.2.6.0?topic=libraries-relocating-tape-pool-different-library#Itfs_ee_relocating_a_tape_pool.

(Continued)

*Primary Examiner* — Eric T Loonan
(74) *Attorney, Agent, or Firm* — Zilka-Kotab, P.C.

(57) ABSTRACT

A computer-implemented method, in accordance with one embodiment, includes receiving a request to migrate data from a source virtual tape system to a destination virtual tape system. A serial number of a logical volume having the data in the destination virtual tape system is added to the destination virtual tape system. An interim logical volume is created on the destination virtual tape system. A conversion table associating the serial number of the logical volume is updated with a serial number of the interim logical volume. The data in the logical volume is migrated to the interim logical volume. In response to completing the data migration, data access requests are satisfied using the logical volume.

19 Claims, 6 Drawing Sheets

(56) References Cited

U.S. PATENT DOCUMENTS

| | | | |
|---|---|---|---|
| 2013/0339647 A1* | 12/2013 | Jindo | G06F 3/0647 |
| | | | 711/E12.103 |
| 2014/0351538 A1* | 11/2014 | Kono | G06F 3/065 |
| | | | 711/162 |
| 2017/0123672 A1 | 5/2017 | Freitag et al. | |
| 2021/0026552 A1 | 1/2021 | Ashkadov et al. | |
| 2022/0091944 A1* | 3/2022 | Goodall | G06F 3/0617 |

OTHER PUBLICATIONS

Asakura et al., "IBM TS7700 Release 5.2.2 Guide," IBM, Redbooks, Jul. 2022, 1076 pages.

\* cited by examiner

DATA MIGRATION BETWEEN VIRTUAL TAPE SYSTEMS USING TAPE VOLSER CONVERSION

BACKGROUND

The present invention relates to virtual tape systems, and more specifically, this invention relates to migration of data between incompatible virtual tape systems.

A virtual tape system is a tape management system such as a special storage device or group of devices and software which manages data such that the data appears to be stored entirely on tape cartridges, when portions of the data may actually be located in faster storage, e.g., hard disk drives (HDDs) and/or solid state drives (SSDs). Programming for a virtual tape system is sometimes referred to as virtual tape server (VTS), although these terms may be used interchangeably, unless otherwise specifically indicated. A virtual tape system may be used with a hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

In a typical virtual tape storage system, at least one virtual tape server (VTS) is coupled to a tape library comprising numerous tape drives and tape cartridges. The VTS is also coupled to a storage device such as HDD and/or SSD, comprised of numerous interconnected hard disk and/or solid state drives.

The storage device functions as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a cartridge (tape), they are copied on the cartridge end to end, taking up only the space written by the host application. This arrangement maximizes utilization of a cartridge storage capacity.

The storage management software manages the location of the logical volumes on the physical cartridges, and the customer typically has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

Several companies have virtual tape system offerings. One example is the IBM® TS7700 family. However, when a data owner wishes to migrate data from the composite library on one vendor's product to the composite library on another vendor's product, there has heretofore been no available method to copy the data directly from the virtual tape system of one vendor to that of another vendor. This is due, at least in part, to the fact that the format specification for the logical volume data that is held within a tape device of each vendor is not published, and thus the data cannot be read after transfer, even if the data can be directly copied by FTP/SCP or the like. Therefore, in the case where data migration is performed, inevitably, the virtual tape systems of both vendors are attached to a logical partition (LPAR) as different composite libraries. Then, the data copy tool on the LPAR (e.g., zLPAR) performs the data migration by reading the data from the old composite library and writing the data to the new composite library.

Under an identical LPAR, there can be only one volume serial number (VOLSER) for any logical volume. Accordingly, when the data migration is performed from the old to new composite library, the same VOLSER cannot be used to write the data into the new composite library. Therefore, in the case where the data migration is performed in units of logical volumes, an additional sequence of steps has historically been required, namely to first migrate the volume to a temporary logical volume, then insert a logical volume which has the same VOLSER as the volume had in the old composite library into the new composite library, and copy the data again after the migration is done. Thus, the data was written into the new composite library twice to complete the migration.

SUMMARY

A computer-implemented method, in accordance with one embodiment, includes receiving a request to migrate data from a source virtual tape system to a destination virtual tape system. A serial number of a logical volume having the data in the destination virtual tape system is added to the destination virtual tape system. An interim logical volume is created on the destination virtual tape system. A conversion table associating the serial number of the logical volume is updated with a serial number of the interim logical volume. The data in the logical volume is migrated to the interim logical volume. In response to completing the data migration, data access requests are satisfied using the logical volume.

A computer program product for migrating data from a source virtual tape system to a destination virtual tape system, in accordance with one embodiment, includes a computer readable storage medium having program instructions embodied therewith, the program instructions executable by a computer to cause the computer to perform the foregoing method.

A system, in accordance with one embodiment, includes a processor, and logic integrated with the processor, executable by the processor, or integrated with and executable by the processor, the logic being configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
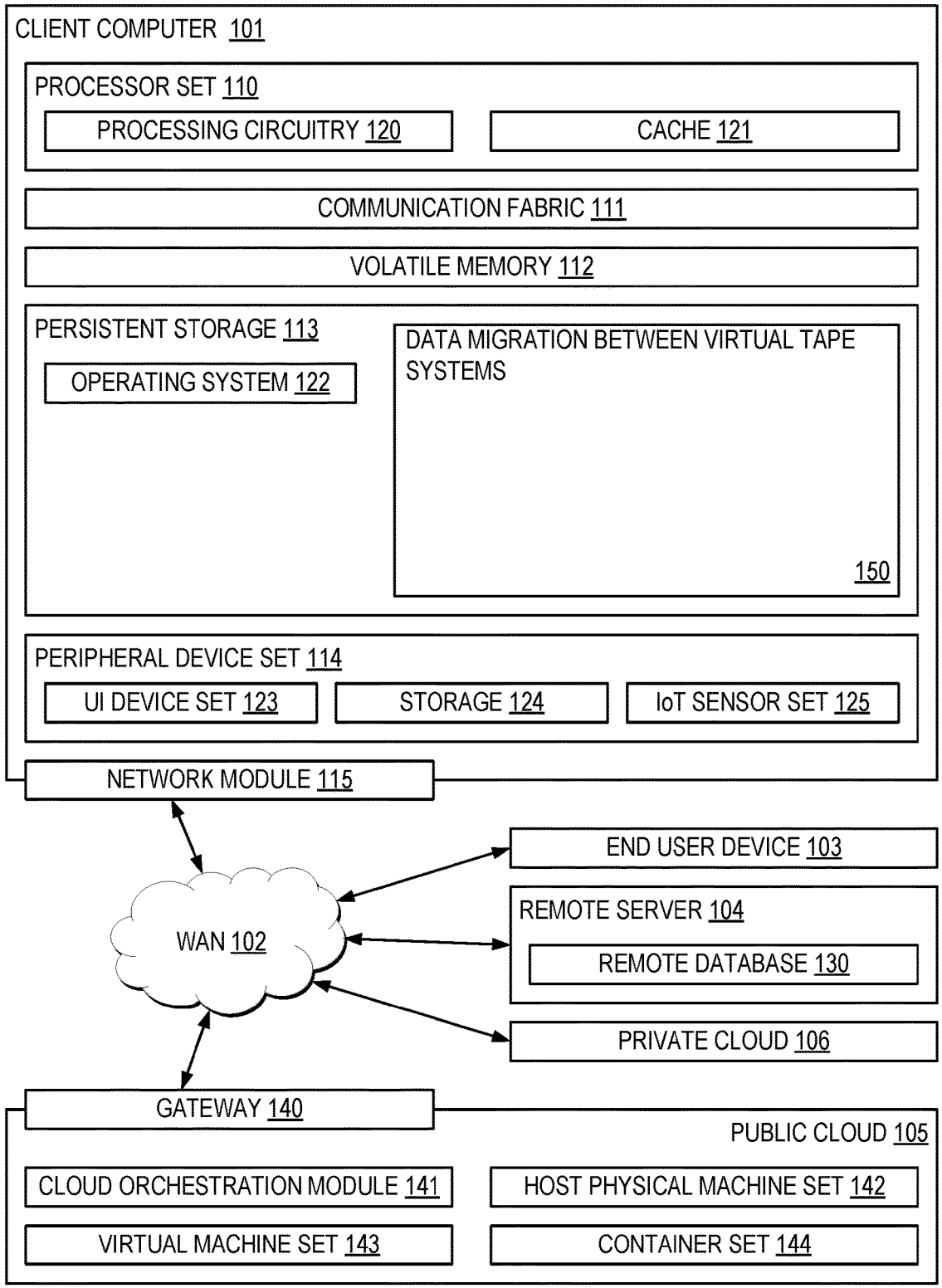
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for enabling the reading and writing of data between two logical volumes with the same serial number (VOLSER) under an identical LPAR.

In one general embodiment, a computer-implemented method includes receiving a request to migrate data from a source virtual tape system to a destination virtual tape system. A serial number of a logical volume having the data in the destination virtual tape system is added to the destination virtual tape system. An interim logical volume is created on the destination virtual tape system. A conversion table associating the serial number of the logical volume is updated with a serial number of the interim logical volume. The data in the logical volume is migrated to the interim logical volume. In response to completing the data migration, data access requests are satisfied using the logical volume.

In another general embodiment, a computer program product for migrating data from a source virtual tape system to a destination virtual tape system includes a computer readable storage medium having program instructions embodied therewith, the program instructions executable by a computer to cause the computer to perform the foregoing method.

In another general embodiment, a system includes a processor, and logic integrated with the processor, executable by the processor, or integrated with and executable by the processor, the logic being configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as code for data migration between virtual tape systems in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a SAN that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
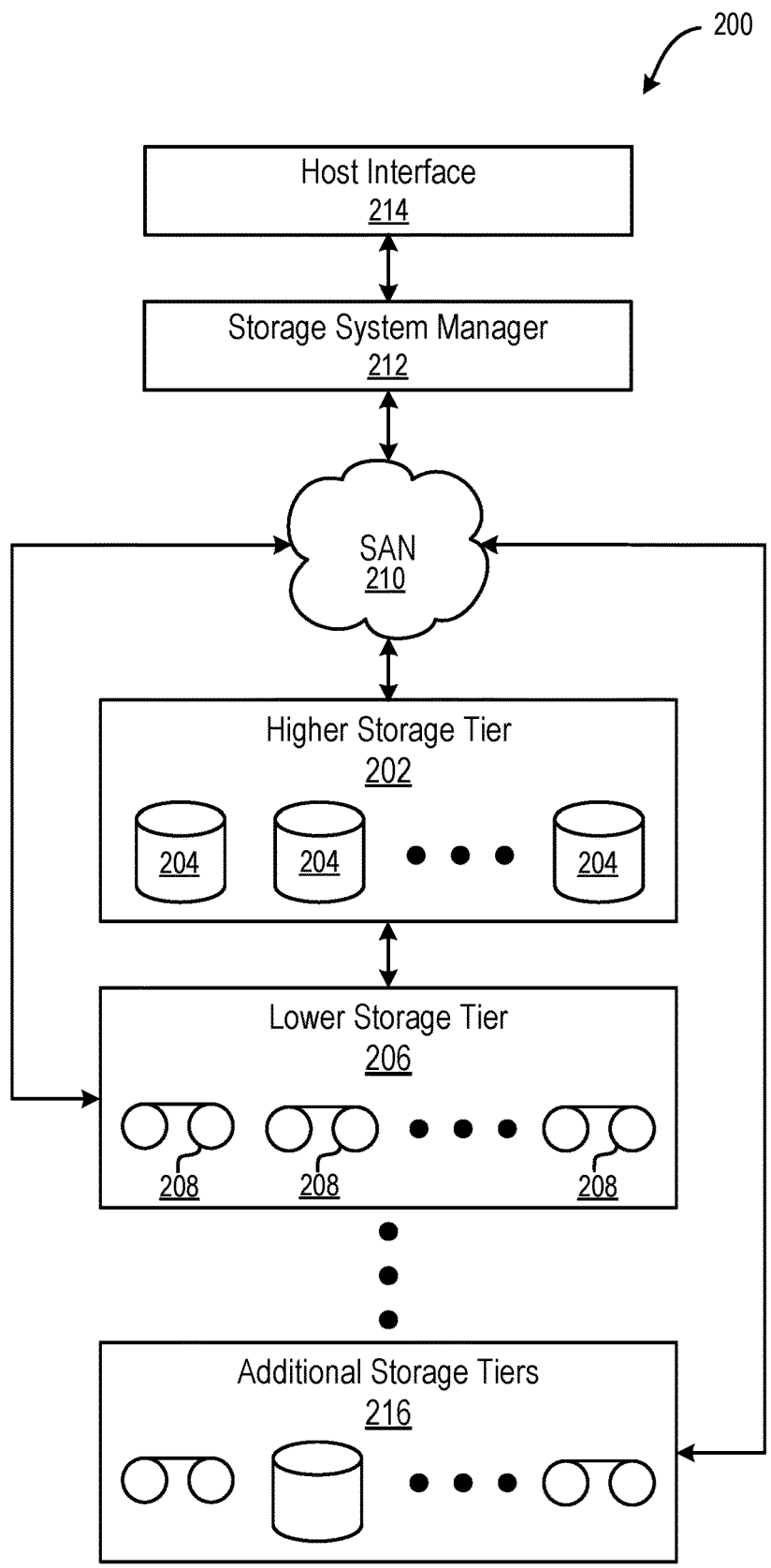
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, an Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Figure 3:
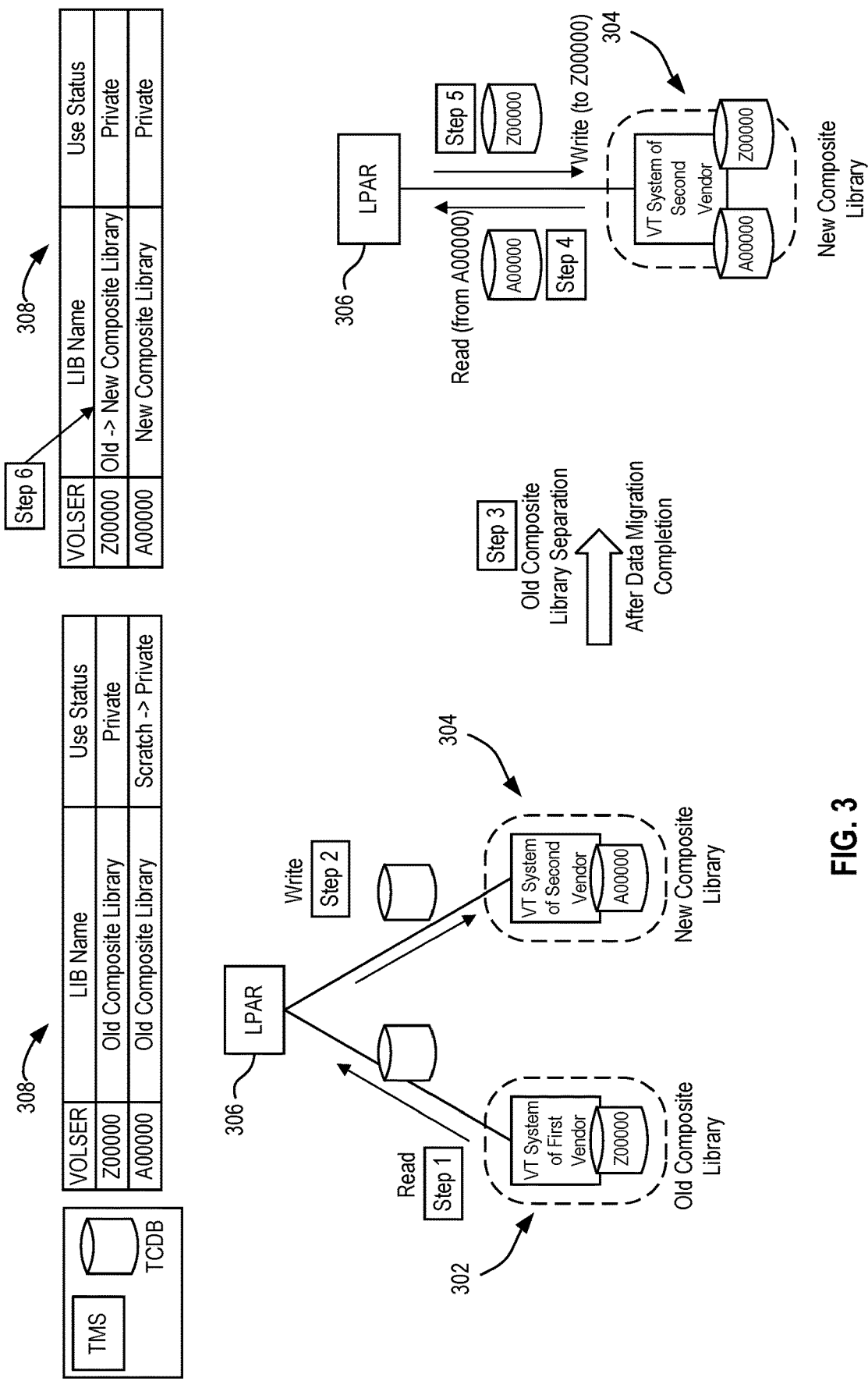
FIG. 3 is a graphical depiction of a data migration process between two virtual tape systems.

As alluded to above, for data migration from a virtual tape system of one vendor to a virtual tape system of another vendor, (e.g., from a vendor's virtual tape system to an IBM® TS7700, from an IBM® TS7700 to another vendor's virtual tape system, etc.) there has heretofore been no available method to copy the data directly from the source virtual tape system to the destination virtual tape system without requiring copying of the data twice, because the format specification for the logical volume data that is held within a tape device of each vendor is not published, so the data cannot be read even if the data can be directly copied by FTP/SCP or the like. Therefore, as shown in FIG. 3, where such data migration is performed, inevitably, the virtual tape (VT) systems 302, 304 of both vendors are attached to a logical partition (LPAR) 306, such as IBM® zLPAR, as different composite libraries. See step 1. Then, the LPAR 306 performs the data migration by reading the data from the old composite library and writing the data to the new composite library. See step 2.

However, under an identical LPAR, there can be only one serial number (VOLSER) for any logical volume. Thus, when the data migration is performed from the old to new composite library, the same logical volume serial number Z00000 cannot be used to write the data into the new composite library. Accordingly, the logical volume in the new composite library has a new serial number, here A00000. Therefore, in the case where the data migration is performed in units of logical volumes, it was required to insert a logical volume which has the same serial number in the old composite library into the new composite library and copy the data again after the migration is done, in accordance with a catalog (e.g., TCDB/TMS) 308 of the LPAR. See steps 3, 4, 5, and 6. Thus, the data had to be written into the new composite library twice to complete the migration.

The embodiments described herein avoid the work of performing the data copy multiple times, as described above, when performing data migration between the virtual tape system products of different vendors. This in turn decreases the time and workload for the data migration, thereby reducing resource consumption on the destination tape library system, reduces system latency by completing the migration more quickly thereby improving performance of the virtual tape system, etc.

By extending the functionality in a virtual tape system in a new and novel way, a logical volume with a different serial number from the one for actually saving the data may be provided to an LPAR of otherwise conventional configuration, thereby enabling the migration of data between two logical volumes with substantially the same (or the same) serial number under an identical LPAR.

In one embodiment, the logical volume that is used by the LPAR is inserted from a management interface by specifying the serial number and is managed for each serial number. The inserted serial number is maintained by a plurality of internal relational database tables in the virtual tape system. Such table may be a LVOL_TOK table of known type, or the like. When the logical volume is inserted, a database record having the serial number of the logical volume as a primary key is created in the table, the database record is adopted as a parent table entry, and some child table entries (such as a conventional LVOL entry or the like) are created.

Continuing with the exemplary embodiment, when the destination virtual tape system receives, from the LPAR, a scratch mount request for a scratch volume belonging to a designated category code for the writing of the data, the destination virtual tape system selects a currently available logical volume (serial number) belonging to the category code, preferably from the logical volumes already inserted in the table, and provides the acquired logical volume to the LPAR. Thereafter, when the destination virtual tape system receives a private mount request with the designated serial number for reading data from the logical volume or writing additional data to the logical volume, the destination virtual tape system acquires the logical volume (serial number) from the table and provides it to the LPAR in a conventional manner.

To solve the problems mentioned above, a new field is added in the internal database of the destination virtual tape system with respect to the logical volume serial number that is provided to the LPAR, and a relationship (e.g., an alias-like relationship) is created between a serial number for which the data is actually written and the one that is provided to the LPAR. See, e.g., steps 2-3 and 5 in FIG. 5 and related description below. Various combinations and permutations of the following techniques may be employed, in accordance with various embodiments of the present invention.

Figure 4:
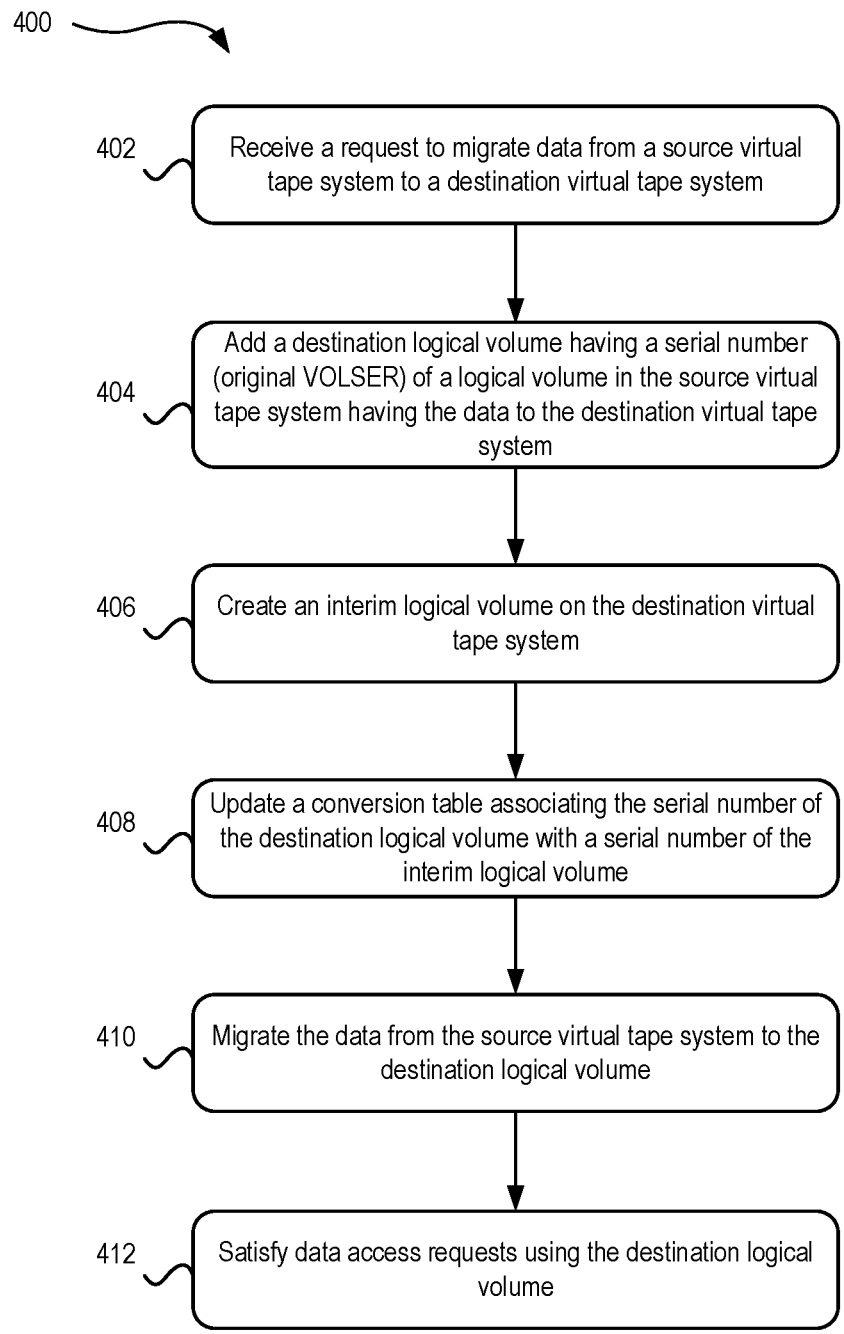
FIG. 4 is a flowchart of a method for migrating data from a source virtual tape system (e.g., migration source library) to a destination virtual tape system (e.g., migration destination library), in accordance with one embodiment.

Now referring to FIG. 4, a flowchart of a method 400 for migrating data from a source virtual tape system (e.g., migration source library) to a destination virtual tape system (e.g., migration destination library), is shown according to one embodiment. The method 400 may be performed in accordance with the present invention in any of the environments depicted in FIGS. 1-3 and 5, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller of a virtual tape system, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Moreover, with the exception of the modifications and improvements described herein, the source and destination virtual tape systems may be of otherwise conventional design, construction, and operation.

As shown in FIG. 4, method 400 may initiate with operation 402, where a request to migrate data from a source virtual tape system to a destination virtual tape system is received.

The source virtual tape system and the destination virtual tape system may be from different vendors, or may be otherwise generally incompatible (i.e., not amenable to direct data transfer such as via FTP). For example, the source virtual tape system may be a product of a first company, and the destination virtual tape system may be a product of a second company.

In operation 404, a destination logical volume having a serial number (original VOLSER) of a logical volume having the data in the source virtual tape system is added to (inserted in) the destination virtual tape system, e.g., in a database that is associated with the destination virtual tape system. For example, the serial number may be the original serial number used for the logical volume storing the data in the source virtual tape system. In the present example, the serial number (original VOLSER) may be in the range of Z00000-Z09999. Equivalently, the serial number of the logical volume may be in a range of serial numbers corresponding to logical volumes having data to be migrated to the destination virtual tape system. See also step 1 of FIG. 5.

In operation 406, an interim logical volume is created on the destination virtual tape system. The interim logical volume has a different serial number, e.g., a serial number (interim VOLSER) in the range of A00000-A09999. See also step 2 of FIG. 5.

In operation 408, a conversion table associating the serial number of the destination logical volume with a serial number of the interim logical volume is updated (or equivalently, created if the conversion table is not yet created, the conversion table is created on the fly as needed, etc.). Equivalently, where the data to be migrated is associated with a range of serial numbers, the conversion table may be updated to associate the range of serial numbers of the logical volume with a range of serial numbers of the corresponding interim logical volumes. See also steps 3-4 of FIG. 5.

In one embodiment, the table is updated (or created) in response to a request, such as a request submitted via a management interface, a host console request, etc., and the serial number of the interim logical volume remains a constant value during the data migration.

In operation 410, the data in the logical volume of the source virtual tape system is migrated to the destination logical volume.

In some embodiments, an access request may be received while the data is being migrated, the access request having the serial number of the interim logical volume. The access request may be converted into an access request for the logical volume being transferred using the conversion table. For example, the request may be to access data in the interim logical volume. In response, an action associated with the request may be performed on a filter in a cache under the serial number of the logical volume being transferred. In another example, the request is to access an entry for the interim logical volume in a database associated with the interim logical volume. In response to the request, an action associated with the request is performed in the database under the serial number of the logical volume being transferred. See also step 6 of FIG. 5.

In operation 412, in response to completing the data migration, data access requests (e.g., read and/or write requests) are satisfied by performing the requested action using the destination logical volume. This may be achieved by updating a conventional catalog, e.g., a TMS/TCDB catalog. See also step 7 of FIG. 5. Preferably, the conversion table is reset to remove the association between the serial numbers of the logical volume and the interim logical volume.

Figure 5:
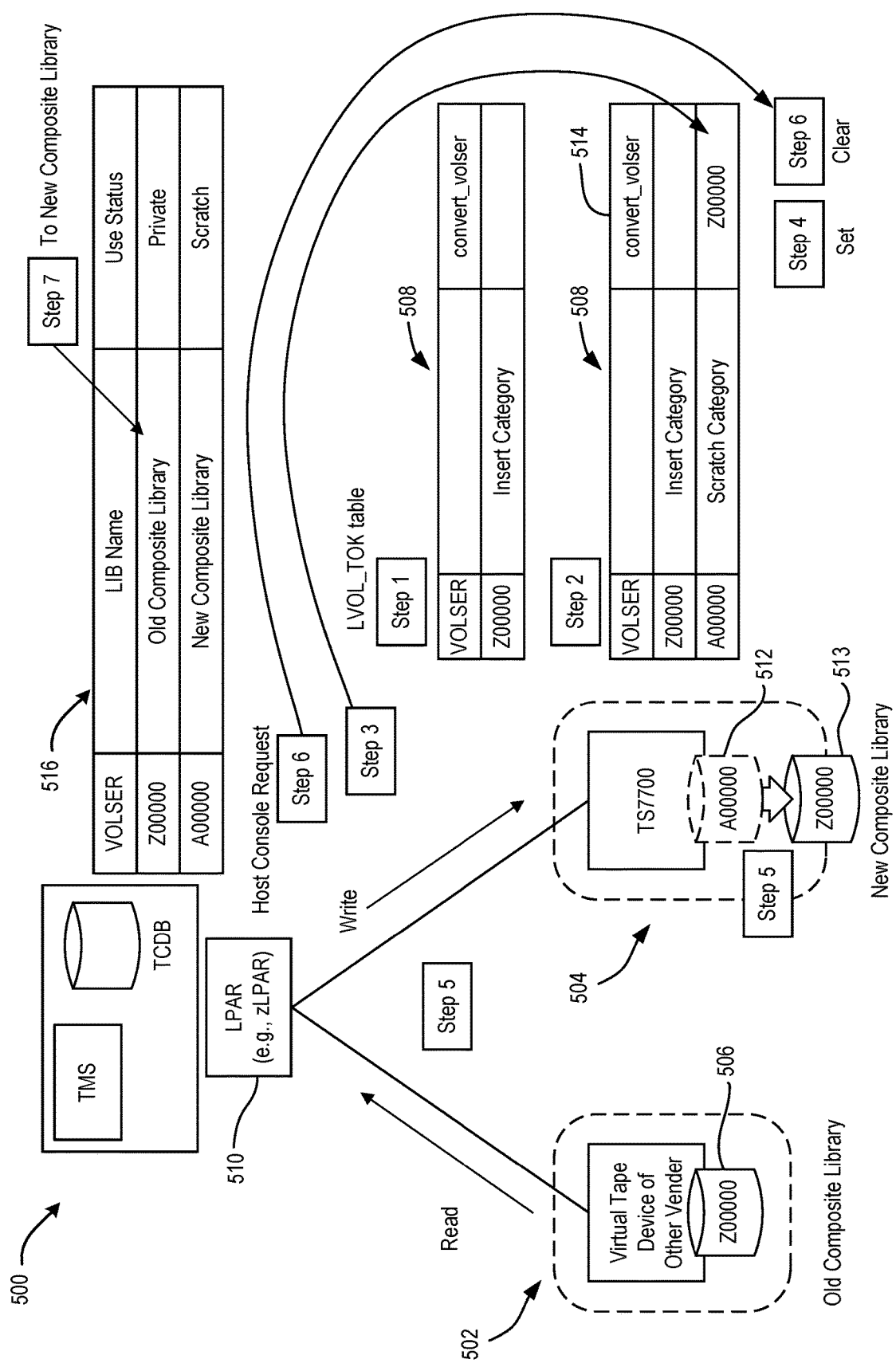
FIG. 5 is a graphical depiction of a data migration process between two virtual tape systems, in accordance with preferred embodiments.

FIG. 5 is a graphical depiction 500 of a data migration process between two virtual tape systems 502, 504, in accordance with preferred embodiments. As an option, the present graphically depicted process may be implemented in conjunction with features from any other embodiment listed herein, such as those described with reference to the other FIGS., especially FIG. 4. Of course, however, such graphically depicted process and others presented herein may be used in various applications and/or in permutations which may or may not be specifically described in the illustrative embodiments listed herein. Further, the graphically depicted process presented herein may be used in any desired environment. With the exception of the modifications and improvements described herein, including the configuration that enables the present data migration process, the various components shown may be of otherwise conventional design, construction, and/or operation. Moreover, more or fewer steps than those specifically described in FIG. 5 may be included in the process, as would be understood by one of skill in the art after reading the present descriptions.

As shown, the "old" composite library of a source virtual tape system 502 holds data to be migrated to the "new" composite library of a destination virtual tape system 504. The data is stored in the old composite library of the source virtual tape system 502 in a logical volume 506 having serial number (VOLSER) Z00000.

In step 1 of FIG. 5 (see label "Step 1"), the serial number (VOLSER) for a logical volume that is to be finally used for the migrated data is inserted on the destination virtual tape system, e.g., in a table, such as a LVOL_TOK table 508 or the like. That final serial number may be, and preferably is, the same serial number as the logical volume holding the data on the source virtual tape system of the other vendor. The logical volume in this example is a serial number in the range Z00000-Z09999, namely Z00000. As a result of the insert operation, a category state change attention is sent to the attached LPAR 510. Again, the serial number is set so as to belong to the old composite library, as shown. Therefore, a category to which the serial number belongs is not changed to a preset scratch category, and the state of an insert category code on the logical volume is not updated. See also operations 402-404 of FIG. 4.

In step 2, an interim logical volume 512 that is used for data migration on an interim basis is inserted on the destination virtual tape system. The serial number for the interim logical volume is, in this example, a number in the range A00000-A09999, namely A00000, which may be added to the table 508. This logical volume may be recognized as a scratch volume by the connected LPAR. See also operation 406 of FIG. 4.

As noted above, the logical volume serial number that is provided to the LPAR is that of the interim logical volume (A00000), but the data will actually be migrated to another logical volume 513 that preferably has the serial number (e.g., Z00000) of the source volume 506. As described below, a relationship (e.g., an alias-like relationship) is created between the serial number (Z00000) for which the data is actually written and the one (A00000) that is provided to the LPAR.

In step 3, the serial number (Z00000) of the logical volume to be used after the data migration is paired with the serial number (A00000) that is used on an interim basis during the data migration. The method of this registration can include a method of using a management interface, a host console request and the like, and a method of writing a pair of logical volumes as a specific request keyword in the logical volume using a conventional bulk volume information retrieval (BVIR) feature of the destination virtual tape system. For example, in the case where the host console request is used, "LI REQ, <composite library ID>, CONVTVOL, <final volser>, <interim volser>" (in this example, <final volser>='Zxxxxx' (a serial number that is used in the old composite library), and <interim volser>='Axxxxx' (a serial number that is used on an interim basis in the new composite library)) can be considered. The logical volume serial numbers may be collectively designated as a certain range, instead of being individually designated. In that case, for example, a pair of serial number ranges is written in the BVIR logical volume, as described below.

VTS BULK VOLUME DATA REQUEST
VOLUME CONVERSION
<final volser range>, <interim volser range>
Z00000: Z09999, A00000: A09999
See also operation 406 of FIG. 4.

After Step 3, LPAR can access the data on Z00000 in the new composite library by addressing A00000.

At step 4, a "convert_volser" column 514 is updated or added to a LVOL_TOK database in the destination virtual tape system, thereby creating a conversion table. At the step when the above host console request is received, or at the time when the logical volume is demounted in the case of the range designation of the serial number using BVIR, the serial number is read and the LVOL_TOK database is updated. For example, in the case where "LI REQ, <composite library ID>, CONVTVOL, Z00000, A00000" is received, 'Z00000' is added to "convert_volser" of the record for the logical volume serial number 'A00000' on the LVOL_TOK table 508. See also operation 408 of FIG. 4.

At step 5, the data is migrated. Moreover, once the setting of step 4 is applied, in the case where the access (both data and metadata) to the logical volume 'A00000' is requested from the LPAR 510 in a request such as scratch mount, private mount, category change or the display of the logical volume state and so forth, a component in the destination virtual tape system 504 reads the LVOL_TOK table record, the access to 'A00000' is actually viewed as the access to 'Z00000', and the update of the database or the actual reading/writing of data is converted so as to be performed on a database entry or to a file on the cache for the serial number 'Z00000'. Therefore, when the category of 'A00000' is changed, the category of 'Z00000' is concurrently changed, so that scratch/private attribute in the LPAR catalog becomes consistent as well.

After completing the data migration, the LPAR may still connect to both composite libraries (old and new). The target data is on Z00000 in the old composite library, and it has been copied to A00000 in the new composite library. Because only a single volume can be defined under an identical LPAR, LPAR cannot access the volume Z00000 in the new composite library yet.

LPAR metadata (TCDB/TMS) shows that the data is still on Z00000 in the old composite library. Accordingly, the application on the LPAR can still access Z00000 in the old composite library if it needs to read/update the data.

Figure 6:
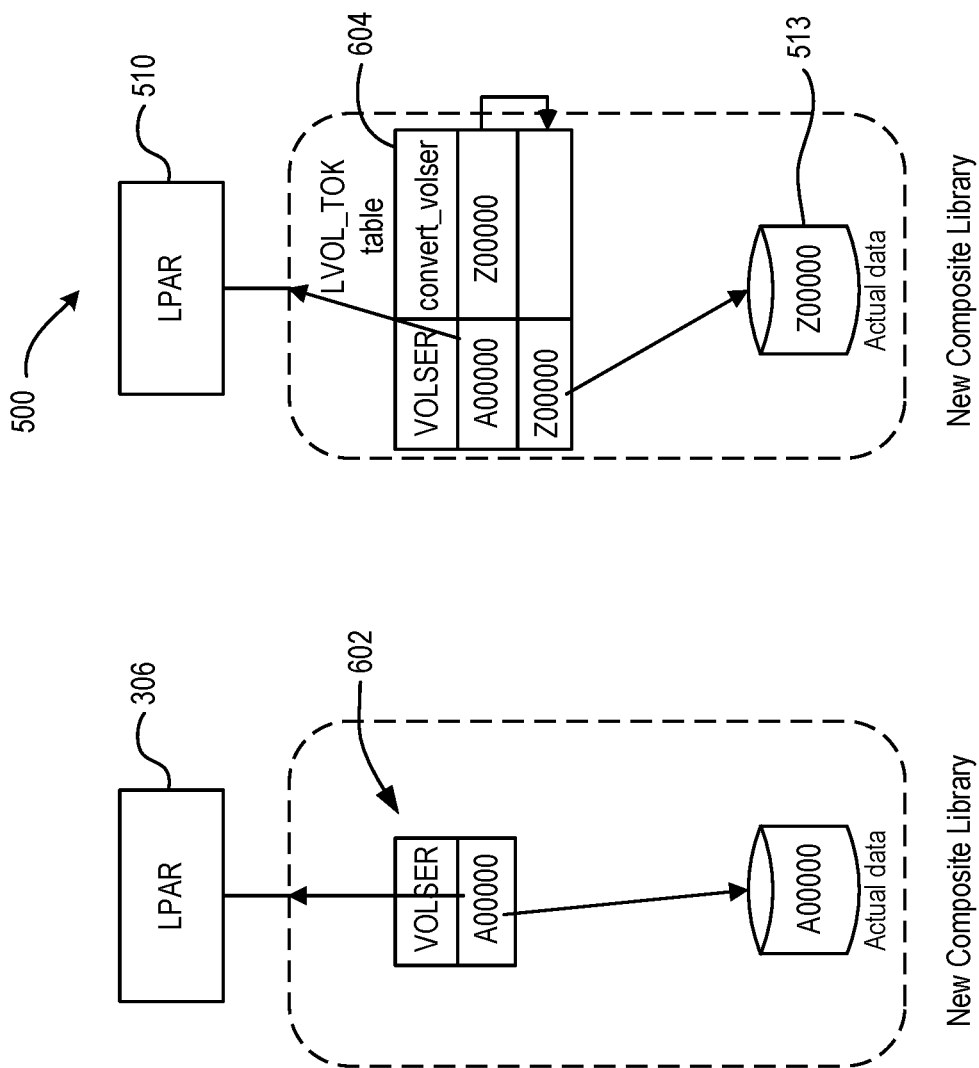
FIG. 6 is a graphical depiction of the table usage to correlate the table entry with actual data, in accordance with a preferred embodiment.

To further explain the foregoing step(s), reference is made to FIG. 6, which exemplifies the improvement in various embodiments. As shown on the left hand side of the drawing, in a method performed without the new conversion table, LPAR 306 uses A00000 to write/read the data, and actual data is stored as A00000. Only one database entry is found in the table 602. The actual data is named A00000 in cache. Thus, the table entry and actual data have a one-on-one correspondence.

Referring next to the right side of FIG. 6, which depicts the present methodology according to one embodiment, LPAR uses A00000 to write/read the data, but the actual data is stored in logical volume 513 having serial number Z00000. As shown, there are two database entries in the LVOL_TOK table 604. The table includes the "convert volser" field, defining the relationship between A00000 and Z00000. The actual data is named Z00000 in cache. No data named A00000 exists. The table entry and actual data for Z00000 have a one-on-one correspondence as well. When LPAR requests access to A00000, the new composite library actually provides the data of Z00000 using the association defined in the convert_volser field.

This arrangement provides an advantage in that if the data is saved as both A00000 and Z00000, that data consumes additional capacity (doubled) in the cache, which is not desirable. Instead, this exemplary embodiment (and others described herein) uses the alias defined in convert_volser so that only one actual data instance (Z00000) need be stored, and which can be accessed as A00000 from LPAR. Thus, LPAR is able to copy Z00000 data from the old composite library to A00000 in the new composite library. From the viewpoint of the LPAR, the data is saved to A00000, but the actual data is saved as Z00000 in the new composite library.

Referring again to FIG. 5, at step 6, once the data has been moved from source virtual tape system 502 to the destination virtual tape system 504, for performing the logical volume access as the original serial number (Z00000) instead of the serial number that is used on an interim basis (A00000), the corresponding convert_volser on LVOL_TOK 508 is cleared, e.g., using a host console request (for example, LI REQ, <composite library ID>, RESTVOL, <interim volser>, <final volser>) or the like again (even if this step is not performed, the access to the target logical volume (Z00000) becomes possible by executing the next step; but if the operation for the access to the interim logical volume (A00000) is mistakenly performed, the target logical volume (Z00000) is still accessed).

At some point, the old composite library is removed from the LPAR. However, simply removing the old composite library would cause a problem because LPAR metadata still points to the data located in the old composite library. Accordingly, the metadata is updated, as described in Step 7 of FIG. 5.

At step 7, the catalog 516 (e.g., TCDB/TMS) on the LPAR is updated such that the corresponding logical volume exists in the new composite library of the destination virtual tape system 504. See also operation 412 of FIG. 4.

Before or after step 7, the conversion table described in Step 6 of FIG. 5 is preferably updated. Note that the conversion table may be maintained in some embodiments. However, if the conversion table is maintained and an erroneous operation is performed on A00000 in the new composite library, the results of the improper operation are also reflected in Z00000 in the new composite library. Thus, it is desirable to clear the conversion table before LPAR starts accessing Z00000 in the new composite library.

Thereafter, in the case where 'A00000' becomes unnecessary, the entries in the LPAR 510 and the destination virtual tape system 504 may be erased by ejecting the interim logical volume (A00000) from the host. The logical volume Z00000 can be successively used in the new composite library.

One aspect of the procedure depicted in FIG. 5 is that once the conversion table relationship is set (A00000→Z00000), the actual data is written and saved as 'Z00000' and all LPAR requests to A00000 are handled as if they were requested to Z00000. Accordingly, no actual data is saved as A00000. In other words, once the conversion table is updated to clear the relationship, A00000 no longer has any data. A00000 can be reused to write new data again, e.g., in later migration operations with new source and target logical volumes where an association is made between A00000 and the new target logical volume. A00000 can be ejected if it is no longer required.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   receiving a request to migrate data from a source virtual tape system to a destination virtual tape system,
   adding, to the destination virtual tape system, a destination logical volume having a same serial number as a logical volume in the source virtual tape system having the data;
   creating an interim logical volume on the destination virtual tape system;
   updating a conversion table associating the serial number of the destination logical volume with a serial number of the interim logical volume;
   migrating the data from the source virtual tape system to the destination logical volume;
   receiving, while the data is being migrated, an access request having the serial number of the interim logical volume;
   converting the access request into an access request for the logical volume being transferred using the conversion table, the access request for the logical volume being transferred thereby using the same serial number as the logical volume in the source virtual tape system;
   processing the access request for the logical volume being transferred, to thereby satisfy the access request having the serial number of the interim logical volume; and
   in response to completing the data migration, satisfying data access requests using the destination logical volume.

2. The computer-implemented method of claim 1, wherein the serial number of the destination logical volume is an original serial number used for the logical volume in the source virtual tape system.

3. The computer-implemented method of claim 1, wherein the serial number of the destination logical volume is in a range of serial numbers corresponding to logical volumes having data to be migrated to the destination virtual tape system; and comprising updating the conversion table to associate the range of serial numbers of the destination logical volume with a range of serial numbers of interim logical volumes.

4. The computer-implemented method of claim 3, comprising:
   wherein processing the access request for the logical volume being transferred includes performing an action associated with the request on a file in a cache under the serial number of the destination logical volume,
   wherein the source virtual tape system manages the data therein such that the data appears to be stored entirely on tape cartridges, wherein the source virtual tape system is a product of a first company, and the destination virtual tape system is a product of a second company that is different than the first company, wherein the destination virtual tape system manages the migrated data such that the migrated data appears to be stored entirely on tape cartridges, wherein portions of the data are located in faster second storage of the destination virtual tape system, wherein the faster second storage associated with the destination virtual tape system is selected from the group consisting of: hard disk drives and solid state drives.

5. The computer-implemented method of claim 1, wherein the request is to access data in the interim logical volume; and comprising performing an action associated with the request on a file in a cache under the serial number of the destination logical volume.

6. The computer-implemented method of claim 1, wherein the request is to access an entry for the interim logical volume in a database associated with the interim logical volume; and comprising performing an action associated with the request in the database under the serial number of the destination logical volume.

7. The computer-implemented method of claim 1, comprising:
in response to completing the data migration, resetting the conversion table to remove the association between the serial numbers of the destination logical volume and the interim logical volume.

8. The computer-implemented method of claim 1, wherein the source virtual tape system is a product of a first company, and the destination virtual tape system is a product of a second company that is different than the first company.

9. A computer program product for migrating data from a source virtual tape system to a destination virtual tape system, the computer program product comprising a computer readable storage medium having program instructions embodied therewith, the program instructions executable by a computer to cause the computer to:
receive, by the computer, a request to migrate data from a source virtual tape system to a destination virtual tape system;
add, by the computer, to the destination virtual tape system, a destination logical volume having a serial number of a logical volume in the source virtual tape system having the data;
create, by the computer, an interim logical volume on the destination virtual tape system;
update, by the computer, a conversion table associating the serial number of the destination logical volume with a serial number of the interim logical volume;
migrate, by the computer, the data from the source virtual tape system to the destination logical volume;
receive, by the computer while the data is being migrated, an access request having the serial number of the interim logical volume;
convert, by the computer, the access request into an access request for the logical volume being transferred using the conversion table, the access request for the logical volume being transferred thereby using the same serial number as the logical volume in the source virtual tape system;
process, by the computer, the access request for the logical volume being transferred, to thereby satisfy the access request having the serial number of the interim logical volume; and in response to completing the data migration, satisfy data access requests using the destination logical volume.

10. The computer program product of claim 9, wherein the serial number of the destination logical volume is an original serial number used for the logical volume in the source virtual tape system.

11. The computer program product of claim 9, wherein the serial number of the destination logical volume is in a range of serial numbers corresponding to logical volumes having data to be migrated to the destination virtual tape system; and comprising updating the conversion table to associate the range of serial numbers of the destination logical volume with a range of serial numbers of interim logical volumes.

12. The computer program product of claim 9, wherein the request is to access data in the interim logical volume; and
comprising program instructions for causing the computer to perform an action associated with the request on a file in a cache under the serial number of the destination logical volume.

13. The computer program product of claim 9, wherein the request is to access an entry for the interim logical volume in a database associated with the interim logical volume; and comprising program instructions for causing the computer to perform an action associated with the request in the database under the serial number of the destination logical volume.

14. The computer program product of claim 9, wherein the source virtual tape system is a product of a first company, and the destination virtual tape system is a product of a second company that is different than the first company.

15. A system, comprising:
a processor; and
logic integrated with the processor, executable by the processor, or integrated with and executable by the processor, the logic being configured to:
receive a request to migrate data from a source virtual tape system to a destination virtual tape system,
wherein the source virtual tape system manages the data such that the data appears to be stored entirely on tape cartridges in the source virtual tape system, wherein portions of the data are located in faster storage of the source virtual tape system;
add, to the destination virtual tape system, a destination logical volume having a same serial number as a logical volume in the source virtual tape system having the data;
create an interim logical volume on the destination virtual tape system;
update a conversion table associating the serial number of the destination logical volume with a serial number of the interim logical volume;
migrate the data from the source virtual tape system to the destination logical volume,
wherein the destination virtual tape system manages the migrated data such that the migrated data appears to be stored entirely on tape cartridges, wherein portions of the data are located in faster second storage of the destination virtual tape system;
receive, while the data is being migrated, an access request having the serial number of the interim logical volume;
convert the access request into an access request for the logical volume being transferred using the conversion table;

process the access request for the logical volume being transferred to satisfy the access request having the serial number of the interim logical volume; and in response to completing the data migration, satisfy data access requests using the destination logical volume.

16. The system of claim 15, wherein the serial number of the destination logical volume is an original serial number used for the logical volume in the source virtual tape system.

17. The system of claim 15, comprising logic configured to reset the conversion table, in response to completing the data migration, to thereby remove the association between the serial numbers of the destination logical volume and the interim logical volume.

18. The system of claim 15, wherein the source virtual tape system is a product of a first company, and the destination virtual tape system is a product of a second company that is different than the first company.

19. The system of claim 15, wherein the request is to access data in the interim logical volume; and comprising performing an action associated with the request on a file in a cache under the serial number of the destination logical volume.

* * * * *